(12) United States Patent
Fu

(10) Patent No.: US 12,222,196 B2
(45) Date of Patent: Feb. 11, 2025

(54) MEASUREMENT SYSTEM, MEASUREMENT DEVICE, MEASUREMENT METHOD, AND MEASUREMENT PROGRAM

(71) Applicant: OMRON CORPORATION, Kyoto (JP)

(72) Inventor: Xingdou Fu, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/251,322

(22) PCT Filed: Sep. 14, 2021

(86) PCT No.: PCT/JP2021/033802
§ 371 (c)(1),
(2) Date: May 1, 2023

(87) PCT Pub. No.: WO2022/102239
PCT Pub. Date: May 19, 2022

(65) Prior Publication Data
US 2024/0003675 A1    Jan. 4, 2024

(30) Foreign Application Priority Data
Nov. 12, 2020    (JP) ................. 2020-188701

(51) Int. Cl.
*G01B 11/00*    (2006.01)
*B25J 9/16*    (2006.01)
*G06T 7/70*    (2017.01)

(52) U.S. Cl.
CPC .......... *G01B 11/005* (2013.01); *B25J 9/1697* (2013.01); *G06T 7/70* (2017.01); *G06T 2207/10028* (2013.01)

(58) Field of Classification Search
CPC ....... G01B 11/25; G01B 11/24; G01B 11/005; B25J 9/1697; B25J 13/089; G06T 2207/10028; G06T 2207/30164; G06T 7/70; G06T 7/579; G06T 2207/20221; G06V 20/64; G06V 2201/06
USPC .......................... 348/136, 135; 700/259, 253
See application file for complete search history.

(56) References Cited

U.S. PATENT DOCUMENTS

2018/0272539 A1    9/2018  Kitamura
2022/0228851 A1*   7/2022  Miao ................. G01B 11/24

FOREIGN PATENT DOCUMENTS

JP    2015-182144 A    10/2015
JP    2020-180914 A    11/2020

OTHER PUBLICATIONS

Drost Bertram et al., Model Globally, Match Locally: Efficient and Robust 3D Object Recognition. 2010 IEEE Conference on Computer Vision and Pattern Recognition (CVPR), IEEE, 2010.

(Continued)

*Primary Examiner* — Sherrie Hsia
(74) *Attorney, Agent, or Firm* — Knobbe, Martens, Olson & Bear, LLP

(57) ABSTRACT

A measurement system and associated techniques can reduce the time for obtaining 3D data about a target object by measurement. The measurement system includes a 3D sensor installable on a robot to obtain, by measurement, 3D data indicating 3D coordinates of surface points on a surface of a target object, a displacement detector that detects a displacement of a joint of the robot, a drive that drives the joint of the robot, a sensor controller that controls the 3D sensor to obtain 3D data about the target object by measurement at one or more measurement points, an integrator that performs 3D integration of 3D data about the target object obtained by measurement before a first operation performed by the robot on the target object and 3D data about the target object obtained by measurement at the one or more measurement points after the first operation per- (Continued)

formed by the robot on the target object, and a robot controller that outputs, to the drive, a drive command for controlling a second operation performed by the robot based on 3D coordinates of the surface points on the surface of the target object indicated by 3D data obtained through the 3D integration.

9 Claims, 5 Drawing Sheets

(56) References Cited

OTHER PUBLICATIONS

Newcombe Richard A et al., Kinectfusion: Real-Time Dense Surface Mapping and Tracking. ISMAR, 2011, vol. 11, No. 2011.
Besl Paul J; Neil D. McKay, Method for Registration of 3-D Shapes. Sensor Fusion IV: Control Paradigms and Data Structures. International Society for Optics and Photonics, 1992, vol. 1611.
International Search Report for PCT/JP2021/033802, dated Dec. 14, 2021.
Written Opinion of the International Search Authority for PCT/JP2021/033802, dated Dec. 14, 2021.
Extended European Search Report received in European Application No. 21891487.7-1207, dated Oct. 14, 2024, 10 pages.
Marani et al, "A modified Iterative Closest Point Algorithm for 3D Point Cloud Registration", Computer-Aided Civil and Infrastructure Engineering, vol. 31, No. 7, Jan. 12, 2016 Jan. 2, 2016), pp. 515-534, XP072008136, *abstract**section 2.3*.

* cited by examiner

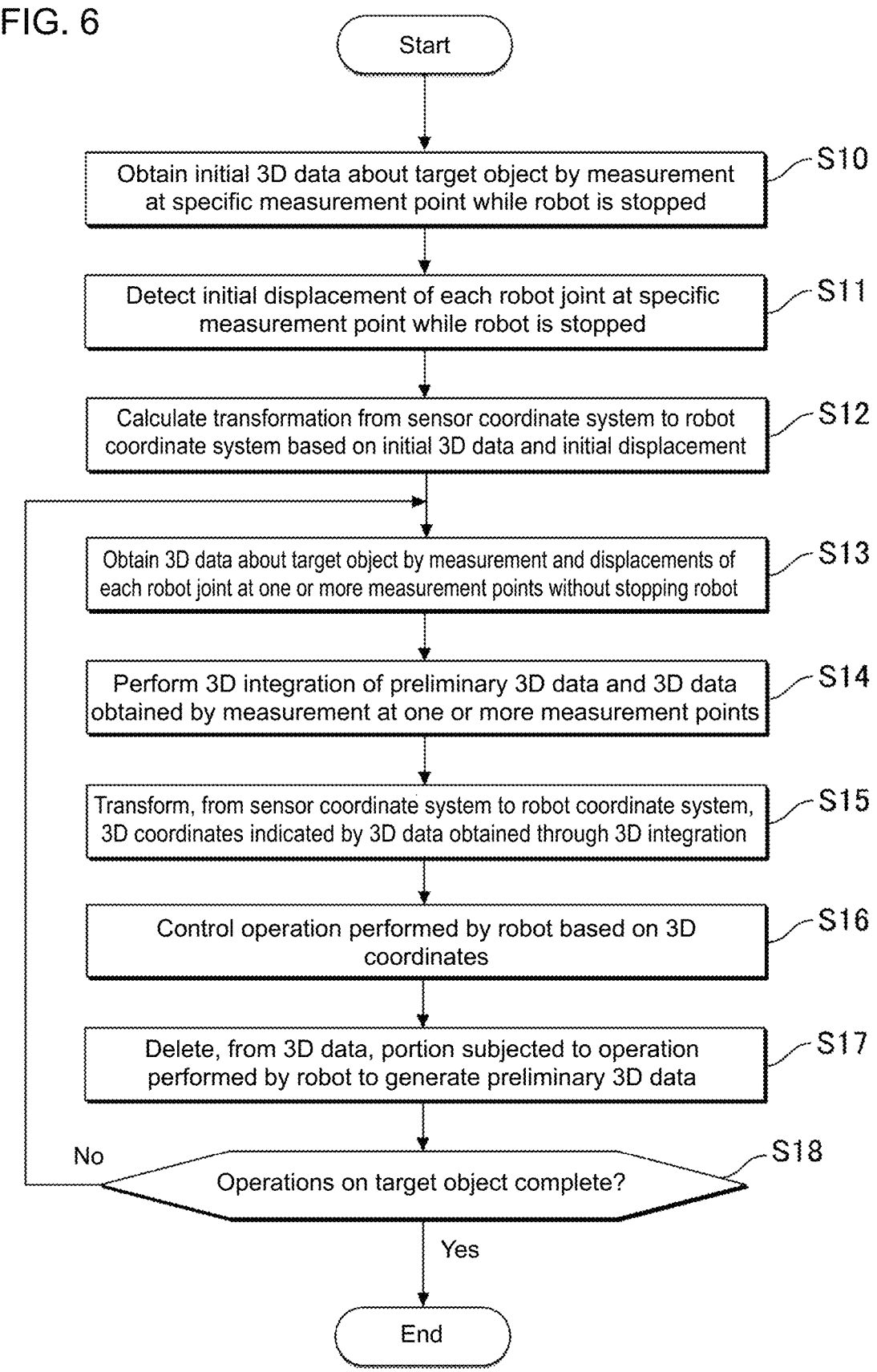

MEASUREMENT SYSTEM, MEASUREMENT DEVICE, MEASUREMENT METHOD, AND MEASUREMENT PROGRAM

FIELD

The present disclosure relates to a measurement system, a measurement device, a measurement method, and a measurement program.

BACKGROUND

Factory automation uses, for example, range sensors to measure a group of points (point clouds) indicating the three-dimensional (3D) coordinates of the points on the surface of a workpiece and to perform image processing for identification or inspection of the workpiece using the group of points obtained by the measurement.

The range sensor for such image processing is referred to as a robot vision and uses various measurement methods. Such methods include, for example, a method for measuring a group of points of a workpiece from a fixed measurement point, a method for measuring groups of points of a workpiece from a moving measurement point, a method for measuring a group of points of a single workpiece from a single measurement point, and a method for measuring multiple groups of points of a single workpiece from multiple different measurement points.

The method for measuring a group of points of a workpiece from a fixed measurement point and the method for measuring a single group of points of a single workpiece may fail to accurately identify a workpiece when the workpiece has a complex shape or a mirror-finished surface that may cause reflection. In contrast, the method for measuring groups of points of a workpiece from multiple different measurement points allows measurement of multiple different groups of points corresponding to different appearances of the workpiece. This method can more accurately identify the workpiece than the method for measuring a group of points of a workpiece from a fixed measurement point and the method for measuring a single group of points of a single workpiece.

Such known image processing includes a model-based algorithm described in, for example, Non-Patent Literature 1. This algorithm uses features known as point pair features (PPFs) that describe the relationship between multiple positions and their normal lines. This algorithm may be used to estimate the position and the orientation of an object and to register the groups of points of the object. The features represent four dimensions and are calculated for a combination of two points (point pair) selected from the groups of points on the object. The four dimensions are specifically the distance between the two points, the two angles each between the line segment between the two points and the normal line of the corresponding point, and the angle between the normal lines of the two points. A hash table stores point numbers of the two points each with a set of features as a key. A matching process includes retrieving corresponding points from the hash table and then obtaining a rigid transformation parameter for the point pair to identify the object. After the matching process, the algorithm calculates the amount of rotation and a displacement of the range sensor between adjacent measurement points, and then registers, based on the calculated results, two groups of points measured at the adjacent measurement points.

Another model-based algorithm is described in Non-Patent Literature 2. This algorithm is to estimate the position and the orientation of a range image sensor based on a range image of an area around the range image sensor measured by the range image sensor. This algorithm calculates the amount of rotation and a displacement of the range image sensor between adjacent measurement points, and then registers, based on the calculated results, two range images measured at the adjacent measurement points.

The registration using the algorithm described in Non-Patent Literature 1 or 2 is coarse registration performed as preprocessing before fine registration.

In Non-Patent Literature 3, the iterative closest point (ICP) algorithm is used for minimizing the distance between corresponding points in multiple groups of points on an object. For each point in one group of points, ICP identifies the closest point in another group of points and tentatively determines the closest point as a corresponding point. ICP estimates rigid transformation that minimizes the distance between corresponding points, and iteratively identifies corresponding points and estimates rigid transformation to minimize the distance between corresponding points in the groups of points. ICP is fine registration performed as postprocessing after coarse registration.

CITATION LIST

Patent Literature

Non-Patent Literature 1: Drost Bertram et al., Model Globally, Match Locally: Efficient and Robust 3D Object Recognition. 2010 IEEE Conference on Computer Vision and Pattern Recognition (CVPR), IEEE, 2010.

Non-Patent Literature 2: Newcombe Richard A et al., Kinectfusion: Real-Time Dense Surface Mapping and Tracking. ISMAR, 2011, Vol. 11, No. 2011.

Non-Patent Literature 3: Besl Paul J; Neil D. McKay, Method for Registration of 3-D Shapes. Sensor Fusion IV: Control Paradigms and Data Structures. International Society for Optics and Photonics, 1992, Vol. 1611.

SUMMARY

Technical Problem

However, the algorithms described in Non-Patent Literatures 1 and 2 may involve numerous computations for image processing and may have low robustness. For a group of points with large displacements between them in an initial state, ICP described in Non-Patent Literature 3 may iteratively identify corresponding points and estimate rigid transformation numerous times or may fail in the registration. Any of the techniques may take lengthy computing time and may not be practical in factory automation that aims higher productivity.

One or more aspects of the present disclosure are directed to a measurement system, a measurement device, a measurement method, and a measurement program that can reduce the time for obtaining 3D data about a target object by measurement.

Solution to Problem

A measurement system according to one aspect of the present disclosure includes a three-dimensional sensor installable on a robot to obtain, by measurement, three-dimensional data indicating three-dimensional coordinates of surface points on a surface of a target object, a displacement detector that detects a displacement of a joint of the robot, a drive that drives the joint of the robot, a sensor controller that controls the three-dimensional sensor to obtain three-dimensional data about the target object by measurement at one or more measurement points, an integrator that performs three-dimensional integration of three-dimensional data about the target object obtained by measurement before a first operation performed by the robot on the target object and three-dimensional data about the target object obtained by measurement at the one or more measurement points after the first operation performed by the robot on the target object, and a robot controller that outputs, to the drive, a drive command for controlling a second operation performed by the robot based on three-dimensional coordinates of the surface points on the surface of the target object indicated by three-dimensional data obtained through the three-dimensional integration.

The measurement system according to the above aspect stores 3D data about a target object obtained by measurement before the first operation performed by the robot on the target object, and performs 3D integration of the 3D data being stored and the 3D data about the target object obtained by measurement at one or more measurement points after the first operation performed by the robot on the target object, thus more robustly generating the 3D data about the target object subjected to the first operation performed by the robot at higher speed. The target object can thus be more reliably identified at higher speed based on the 3D data, allowing the robot to more efficiently perform the second operation on the target object.

In the above aspect, the integrator may delete, from the three-dimensional data about the target object obtained by measurement before the first operation performed by the robot on the target object, a portion subjected to the first operation to generate preliminary three-dimensional data and perform three-dimensional integration of the preliminary three-dimensional data and three-dimensional data about the target object obtained by measurement at the one or more measurement points after the first operation performed by the robot on the target object.

In the above aspect, the 3D integration of the preliminary 3D data obtained by measurement in a preceding operation and one or more 3D data pieces newly obtained by measurement after the operation can more robustly generate 3D data about the target object at higher speed.

In the above aspect, the three-dimensional sensor may obtain, before an initial operation of a plurality of operations performed by the robot on the target object, initial three-dimensional data about the target object by measurement at a specific measurement point while the robot is stopped. The displacement detector may detect, before the initial operation, an initial displacement of the joint of the robot at the specific measurement point while the robot is stopped. The measurement system may further include a transformer that calculates, based on the initial three-dimensional data and the initial displacement, transformation from a sensor coordinate system to a robot coordinate system and transforms, from the sensor coordinate system to the robot coordinate system, the three-dimensional coordinates of the surface points on the surface of the target object indicated by the three-dimensional data obtained through the three-dimensional integration.

In the above aspect, the robot can more accurately perform the operations on the target object based on the 3D data.

In the above aspect, the robot controller may control, after the initial three-dimensional data is obtained by measurement and the initial displacement is detected, the robot to continuously perform the plurality of operations without stopping the robot.

In the above aspect, multiple operations can be continuously performed without stopping the robot for obtaining 3D data by measurement, thus increasing the work efficiency.

In the above aspect, the sensor controller may control the three-dimensional sensor to obtain three-dimensional data about the target object by measurement at the one or more measurement points during driving of the joint of the robot.

In the above aspect, obtaining the 3D data about the target object by measurement without stopping the motion of the robot allows the robot to more efficiently perform operations on the target object.

In the above aspect, the three-dimensional sensor may obtain three-dimensional data about the target object by measurement at the one or more measurement points at timing asynchronous with timing at which the displacement detector detects a displacement of the joint of the robot.

In the above aspect, the robot does not stop moving to match its position and posture for the 3D sensor to obtain the 3D data about the target object by the measurement to its position and posture for the displacement detector to detect the displacement of each joint of the robot. This reduces the time for obtaining the 3D data about the target object by measurement.

A measurement device according to another aspect of the present disclosure is a device for receiving input information indicating a displacement of a joint of a robot output from a displacement detector and outputting a drive command to a drive that drives the joint of the robot. The measurement device includes a three-dimensional sensor installable on the robot to obtain, by measurement, three-dimensional data indicating three-dimensional coordinates of surface points on a surface of a target object, a sensor controller that controls the three-dimensional sensor to obtain three-dimensional data about the target object by measurement at one or more measurement points, an integrator that performs three-dimensional integration of three-dimensional data about the target object obtained by measurement before a first operation performed by the robot on the target object and three-dimensional data about the target object obtained by measurement at the one or more measurement points after the first operation performed by the robot on the target object, and a robot controller that outputs the drive command for controlling a second operation performed by the robot based on three-dimensional coordinates of the surface points on the surface of the target object indicated by three-dimensional data obtained through the three-dimensional integration.

The measurement device according to the above aspect stores 3D data about a target object obtained by measurement before the first operation performed by the robot on the target object, and performs 3D integration of the 3D data being stored and the 3D data about the target object obtained by measurement at one or more measurement points after the first operation performed by the robot on the target object, thus more robustly generating the 3D data about the target object subjected to the first operation performed by the robot at higher speed. The target object can thus be more reliably identified at higher speed based on the 3D data, allowing the robot to more efficiently perform the second operation on the target object.

A measurement method according to another aspect of the present disclosure is implementable by a measurement device including a three-dimensional sensor installable on a robot to obtain, by measurement, three-dimensional data indicating three-dimensional coordinates of surface points on a surface of a target object. The measurement device receives input information indicating a displacement of a joint of the robot output from a displacement detector and outputs a drive command to a drive that drives the joint of the robot. The measurement method includes controlling the three-dimensional sensor to obtain three-dimensional data about the target object by measurement at one or more measurement points, performing three-dimensional integration of three-dimensional data about the target object obtained by measurement before a first operation performed by the robot on the target object and three-dimensional data about the target object obtained by measurement at the one or more measurement points after the first operation performed by the robot on the target object, and outputting the drive command for controlling a second operation performed by the robot based on three-dimensional coordinates of the surface points on the surface of the target object indicated by three-dimensional data obtained through the three-dimensional integration.

The measurement method according to the above aspect stores 3D data about a target object obtained by measurement before the first operation performed by the robot on the target object, and performs 3D integration of the 3D data being stored and the 3D data about the target object obtained by measurement at one or more measurement points after the first operation performed by the robot on the target object, thus more robustly generating the 3D data about the target object subjected to the first operation performed by the robot at higher speed. The target object can thus be more reliably identified at higher speed based on the 3D data, allowing the robot to more efficiently perform the second operation on the target object.

A measurement program according to another aspect of the present disclosure is executable by a measurement device including a three-dimensional sensor installable on a robot to obtain, by measurement, three-dimensional data indicating three-dimensional coordinates of surface points on a surface of a target object. The measurement device receives input information indicating a displacement of a joint of the robot output from a displacement detector and outputs a drive command to a drive that drives the joint of the robot. The measurement program causes the measurement device to perform operations including controlling the three-dimensional sensor to obtain three-dimensional data about the target object by measurement at one or more measurement points, performing three-dimensional integration of three-dimensional data about the target object obtained by measurement before a first operation performed by the robot on the target object and three-dimensional data about the target object obtained by measurement at the one or more measurement points after the first operation performed by the robot on the target object, and outputting the drive command for controlling a second operation performed by the robot based on three-dimensional coordinates of the surface points on the surface of the target object indicated by three-dimensional data obtained through the three-dimensional integration.

The measurement program according to the above aspect stores 3D data about a target object obtained by measurement before the first operation performed by the robot on the target object, and performs 3D integration of the 3D data being stored and the 3D data about the target object obtained by measurement at one or more measurement points after the first operation performed by the robot on the target object, thus more robustly generating the 3D data about the target object subjected to the first operation performed by the robot at higher speed. The target object can thus be more reliably identified at higher speed based on the 3D data, allowing the robot to more efficiently perform the second operation on the target object.

A unit or a device herein does not merely refer to a physical component, but also to the function of the unit or device implemented by software. The function of a single unit or device may be implemented by two or more physical components or devices, or the functions of two or more units or devices may be implemented by a single physical component or device. The unit or device can be also referred to as, for example, means or a system.

Advantageous Effects

The measurement system, the measurement device, the measurement method, and the measurement program according to the above aspects of the present disclosure can reduce the time for obtaining 3D data about a target object by measurement.

BRIEF DESCRIPTION OF THE DRAWINGS

FIG. 6 is a flowchart of the process performed by the measurement system according to the present embodiment.

DETAILED DESCRIPTION

Figure 1:
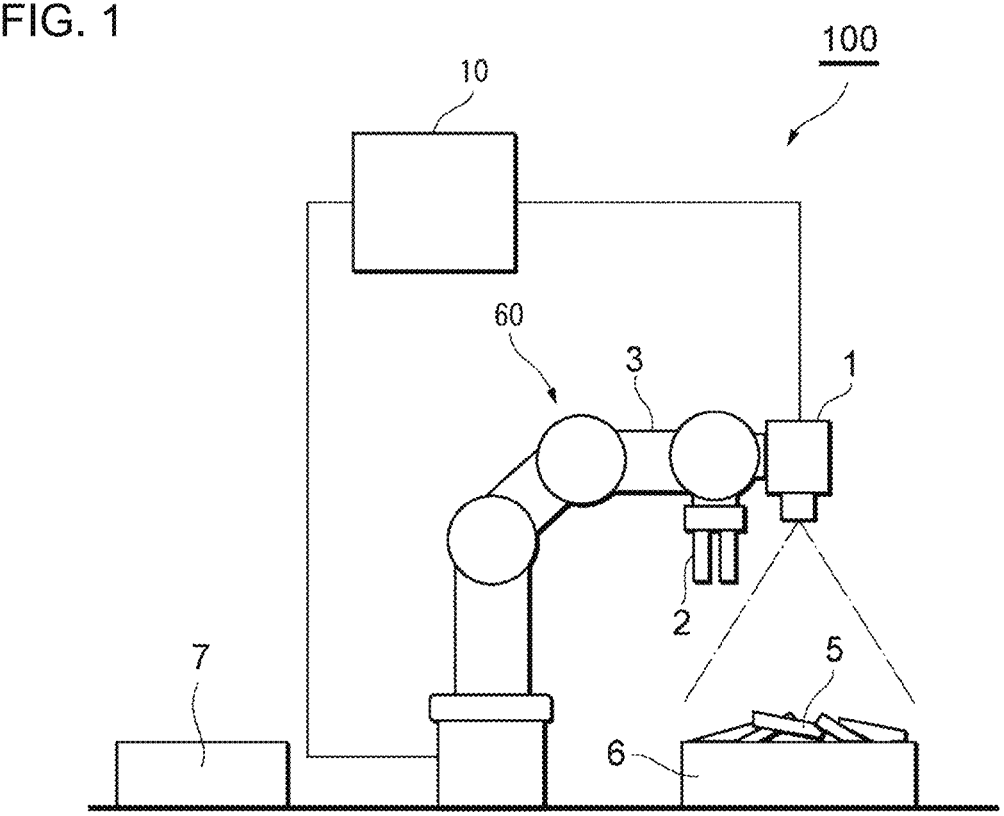
FIG. 1 is a diagram of a measurement system according to an embodiment of the present disclosure, showing its example structure.

One or more embodiments of the present disclosure will now be described with reference to the drawings. An embodiment described below is an example without excluding various modifications and techniques that are not explicitly described below. In other words, an embodiment of the present disclosure may be variously modified for implementation without departing from the spirit and scope of the disclosure. The same or similar reference signs denote the same or similar components in the drawings. The drawings are schematic and are not drawn to scale relative to the actual size of each component. The components may have different relative scales in different drawings. An embodiment described below is not restrictive but is merely illustrative of any embodiment of the present disclosure. Other embodiments conceivable based on the embodiment of the present disclosure described below without creative activity of those skilled in the art fall within the scope of the present disclosure for which protection is sought.

1. Example Use

Figure 2:
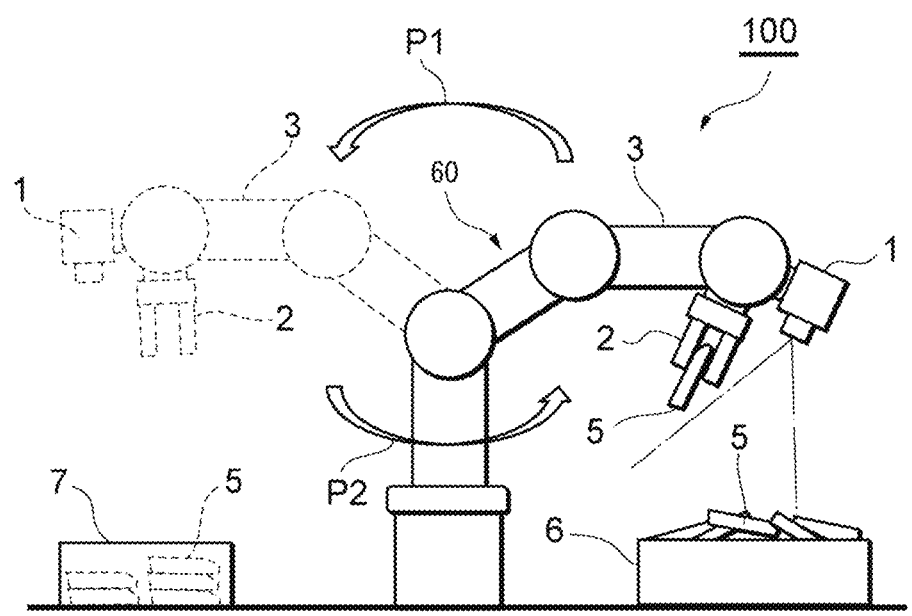
FIG. 2 is a diagram of the measurement system according to the present embodiment, showing an example operation performed by the measurement system on a target object.

An example use of the present disclosure will now be described with reference to FIGS. 1 and 2. FIG. 1 is a diagram of a measurement system 100 according to an embodiment, showing its example structure. FIG. 2 is a diagram of the measurement system 100 according to the present embodiment, showing an example operation performed by the measurement system 100 on a target object 5. The measurement system 100 according to the present embodiment can perform at least one of the operation of picking up one or more randomly piled workpieces (target objects) 5 from a container (e.g., a bin) 6 and transferring and placing the workpieces 5 into, for example, another container 7 in an aligned manner with a robot 60 (refer to a movement path P1 in FIG. 2) or the operation of returning the robot 60 that has transferred a workpiece 5 to the container 6 to pick up the next workpiece 5 (refer to a movement path P2 in FIG. 2). The workpieces 5 may be, for example, horizontally piled on a table or a stand, rather than in the container 6. Examples of the workpieces 5 include, but are not limited to, machine components of an automobile powertrain system (e.g., an engine or a transmission) or electronic components of an electrical system. The measurement system 100 includes, in addition to the robot 60, a three-dimensional (3D) sensor 1 located on the robot 60 and a computer system 10 connected to the 3D sensor 1 and the robot 60.

The 3D sensor 1 is located on the robot 60 to obtain, by measurement, 3D data indicating the 3D coordinates of points on the surface of each workpiece 5. In the present embodiment, as shown in FIGS. 1 and 2, the 3D sensor 1 is attached to a distal end of an arm 3 of the robot 60 to capture images of the workpieces 5 in a predetermined field of view (viewing angle) using predetermined measurement parameters. The sensor 1 may be, for example, a range sensor that measures a group of points, or a range image sensor combining a range sensor and a two-dimensional (2D) sensor to obtain range images. The range sensor measures a distance d as depth information. The 2D sensor is an image sensor that captures 2D images. Unlike range images, 2D images have their pixel values indicating information other than distances d. The range image sensor may be, for example, a camera that captures multiple 2D images of the workpieces 5 with the 2D sensor at different positions and obtains a range image having its pixel values indicating distances d by stereoscopic image processing. In some embodiments, the range image sensor may be a stereo camera that captures the workpieces 5 in different directions at the same time to obtain a range image with its pixel values indicating distances d.

The 3D sensor 1 may optionally include a projector (not shown) that projects, onto the workpieces 5, 3D light including appropriate measurement light (e.g., patterned light or scanning light usable for active methods) or typical 2D light. The projector may have any structure. A projector that projects patterned light, for example, may include a laser source, a patterned mask, and a lens. Light emitted from the laser source is converted into measurement light with a predetermined pattern (patterned light) through the patterned mask with a predetermined pattern and is projected onto the workpieces 5 through the lens.

The predetermined pattern may be any pattern usable with, for example, active one-shot methods. More specifically, for example, the pattern may be a linear pattern with multiple lines that are arranged two-dimensionally at predetermined intervals, an area pattern with multiple types of unit images, unit shapes, geometric shapes, or other structures that are distinguishable from each other and two-dimensionally arranged (regularly or randomly, or with regular and random portions mixed or superimposed), or a grid graph pattern with graphic symbols located on a grid of vertical and horizontal lines. Each predetermined pattern may include identification (ID) information for identifying, for example, lines or unit shapes for encoding.

The workpieces 5 may be measured with any method selected as appropriate from, for example, various active measurement methods using the straightness of light (e.g., spatially encoded pattern projection based on triangulation, temporally encoded pattern projection, or moire topography methods), various passive measurement methods using the straightness of light (e.g., stereo camera methods based on triangulation, visual hull methods, factorization methods, or depth from focus methods based on coaxial range finding), and various active measurement methods using the speed of light (e.g., time of flight based on simultaneous range finding or laser scanning).

The 3D data about the workpieces 5 may be, for example, data (e.g., 3D point group data or range images) obtained with the various measurement methods above, or other appropriate data that can be compared with 3D model data about the workpieces 5. The 3D model data about the workpieces 5 may be, for example, 3D coordinate data, 2D coordinate data resulting from 2D projection of the 3D coordinate data for each of different positions and orientations of each workpiece 5, or other data for appropriate templates or patterns. The comparison with 3D model data is optional for identifying the workpieces 5. The workpieces 5 may be identified without using model data (model-less recognition).

The robot 60 is an articulated robot (e.g., a vertical articulated robot or a horizontal articulated robot) including a hand 2 for manipulating (e.g., gripping, sucking, moving, assembling, or inserting) the workpieces 5 and the robotic arm 3 including the hand 2 at the distal end. The robot 60 incorporates drives such as servomotors each for driving the corresponding joint of the robot 60 to manipulate the workpieces 5 and displacement detectors such as encoders each for detecting a displacement (angular displacement) of the joint. The robot 60 operates as an autonomous manipulator and has various uses in, for example, picking, assembling, conveying, painting, inspecting, polishing, or cleaning the workpieces 5.

The hand 2 is an example end-effector and includes a gripper that can grip and release (grasp and drop) the individual workpieces 5. The arm 3 includes a drive for moving the hand 2 to a grip position (pickup position) for the workpiece 5 in the container 6 and moving the hand 2 gripping the workpiece 5 from the grip position to a release position (drop position) in the other container 7.

The computer system 10 is connected to the 3D sensor 1 and the robot 60. The computer system 10 controls the measurement of the workpieces 5 with the 3D sensor 1, the manipulation of the workpieces 5 with the hand 2, the driving of the robot 60 (e.g., the hand 2 and the arm 3), and other processes for various operations and computations to be performed in the measurement system 100.

The measurement system 100 according to the present embodiment can continuously perform multiple tasks such as picking up one or more workpieces 5 from the container 6 and transferring and placing the workpieces 5 into another container 7 in an aligned manner without stopping the robot 60 for measuring the workpieces 5. Before starting the operations on the workpieces 5, the measurement system 100 obtains, at a specific measurement point, initial 3D data about the workpieces 5 in the container 6 by measurement and detects an initial displacement of each joint of the robot 60 while the robot 60 is stopped. This provides a transformation equation for transforming the 3D coordinates of the points on the surface of each workpiece 5 indicated by the 3D data from the sensor coordinate system to the robot coordinate system.

The measurement system 100 then moves the arm 3 to perform manipulations such as gripping the workpiece 5 in the container 6 with the hand 2 and then causes the 3D sensor 1 to obtain 3D data about the remaining workpieces 5 in the container 6 by measurement at one or more measurement points. During, for example, movement of the arm 3 along the movement path P1 and the movement path P2, the measurement system 100 causes the 3D sensor 1 to obtain the 3D data about the remaining workpieces 5 by measurement.

The measurement system 100 deletes, from the initial 3D data, a portion subjected to an operation performed by the robot 60 (e.g., picking up of the workpiece 5) through, for example, image processing using rendering and a mask (described later) to generate preliminary 3D data. The measurement system 100 then performs, while moving the arm 3, 3D integration of the preliminary 3D data and the 3D data about the workpieces 5 obtained by measurement at one or more measurement points. The 3D integration is performed by, using, for example, the iterative closest point (ICP) algorithm, aligning the position and the orientation in one set of 3D data with the position and orientation in the other set of 3D data. The measurement system 100 then controls a next operation performed by the robot 60 on the workpieces 5 in the container 6 based on the 3D coordinates of the points on the surface of each workpiece 5 indicated by the 3D data obtained through the 3D integration.

To continue the operations on the workpieces 5 in the container 6, the measurement system 100 deletes, from the 3D data obtained through the preceding 3D integration, a portion subjected to the operation performed by the robot 60 to generate (update) preliminary 3D data. The measurement system 100 then performs, during movement of the arm 3, 3D integration of the preliminary 3D data and the 3D data of the workpieces 5 obtained by measurement at one or more measurement points. The measurement system 100 then controls the next operation performed by the robot 60 on the workpieces 5 in the container 6 based on the 3D coordinates of the points on the surface of each workpiece 5 indicated by the 3D data obtained through the 3D integration.

In this manner, the measurement system 100 performs 3D integration of the 3D data about the workpieces 5 obtained by measurement before the operation performed by the robot 60 on the workpieces 5 and the 3D data about the workpieces 5 obtained by measurement at one or more measurement points after the operation performed by the robot on the workpieces 5, identifies the workpieces 5 based on the 3D data obtained through the 3D integration, and controls the next operation performed by the robot 60.

For operations such as picking up of the workpieces 5, the robot 60 may typically be stopped, before a new operation, for obtaining the 3D data about the workpieces by measurement and identifying an operation target workpiece 5. With this method, the robot 60 is to be stopped for each operation. This may decrease the work efficiency. In contrast, the measurement system 100 according to the present embodiment stops the robot 60 before an initial operation to specify the correspondence between the sensor coordinate system and the robot coordinate system and identify the target workpieces 5 without stopping the robot in the subsequent operations. This uses a shorter tact time than when the robot 60 is stopped for obtaining the 3D data by measurement, and increases the work efficiency. The measurement system 100 according to the present embodiment reuses the 3D data generated at a preceding operation, thus reducing the amount of calculation and increasing robustness in 3D integration as compared with when 3D data is newly generated.

2. Example Structure

Hardware Configuration

An example hardware configuration of the measurement system 100 and a measurement device 200 in the embodiment of the present disclosure will now be described with reference to FIG. 3.

The measurement device 200 includes the computer system 10 and the 3D sensor 1. The measurement system 100 includes the measurement device 200, the robot 60, and the robot controller 50. The computer system 10 includes an arithmetic unit 20, a storage and an input-output interface 40. The arithmetic unit 20 includes a central processing unit (CPU) 21, a read-only memory (ROM) 22, and a random-access memory (RAM) 23.

The storage 30 is a computer-readable recording medium, such as a disk medium (e.g., a magnetic recording medium or a magneto-optical recording medium) or a semiconductor memory (e.g., a volatile memory or a nonvolatile memory). Such a recording medium may be referred to as, for example, a non-transitory recording medium. The storage stores at least preliminary data 31 and a measurement program 32. The preliminary data 31 includes the initial 3D data about the workpieces 5 obtained by measurement before the initial operation performed by the robot 60 on the workpieces 5 at the specific measurement point while the robot 60 is stopped, the initial displacement of each joint of the robot 60 detected before the initial operation performed by the robot 60 on the workpieces 5 at the specific measurement point while the robot 60 is stopped, and the preliminary 3D data obtained by deleting, from the 3D data about the workpieces 5 obtained by measurement before the operation performed by the robot 60 on the workpiece 5, a portion subjected to the operation performed by the robot 60. The measurement program 32 is loaded into the RAM 23 from the storage 30 and interpreted and executed by the CPU 21. The measurement program 32 also functions as a main program for controlling the motion of the robot 60.

The arithmetic unit 20 receives, through the input-output interface 40, input information indicating the displacement of each joint of the robot 60 output from the displacement detector 62 and outputs a drive command to each drive 61 that drives the corresponding joint of the robot 60.

The robot controller 50 controls, in response to the drive command output from the arithmetic unit 20 through the input-output interface 40, driving of each drive 61 (e.g., the rotational speed and the torque of the servomotor) that drives the corresponding joint of the robot 60.

The 3D sensor 1 obtains 3D data about the workpieces 5 by measurement in response to a measurement command output from the arithmetic unit 20 through the input-output interface 40.

The arithmetic unit 20 receives, through the input-output interface 40, input 3D data about the workpieces 5 obtained by the 3D sensor 1 by measurement and information indicating the displacement of each joint of the robot 60 output from the displacement detector 62. The arithmetic unit 20 then outputs the measurement command to instruct the 3D sensor 1 to obtain 3D data about the workpieces 5 by measurement and the drive command for controlling the driving of the drives 61. The RAM 23 temporarily stores the 3D data about the workpieces 5 obtained by the 3D sensor 1 by measurement and the information indicating the displacement of each joint of the robot 60 output from the displacement detector 62 and functions as a work area for the arithmetic unit 20 to perform registration 300.

Figure 3:
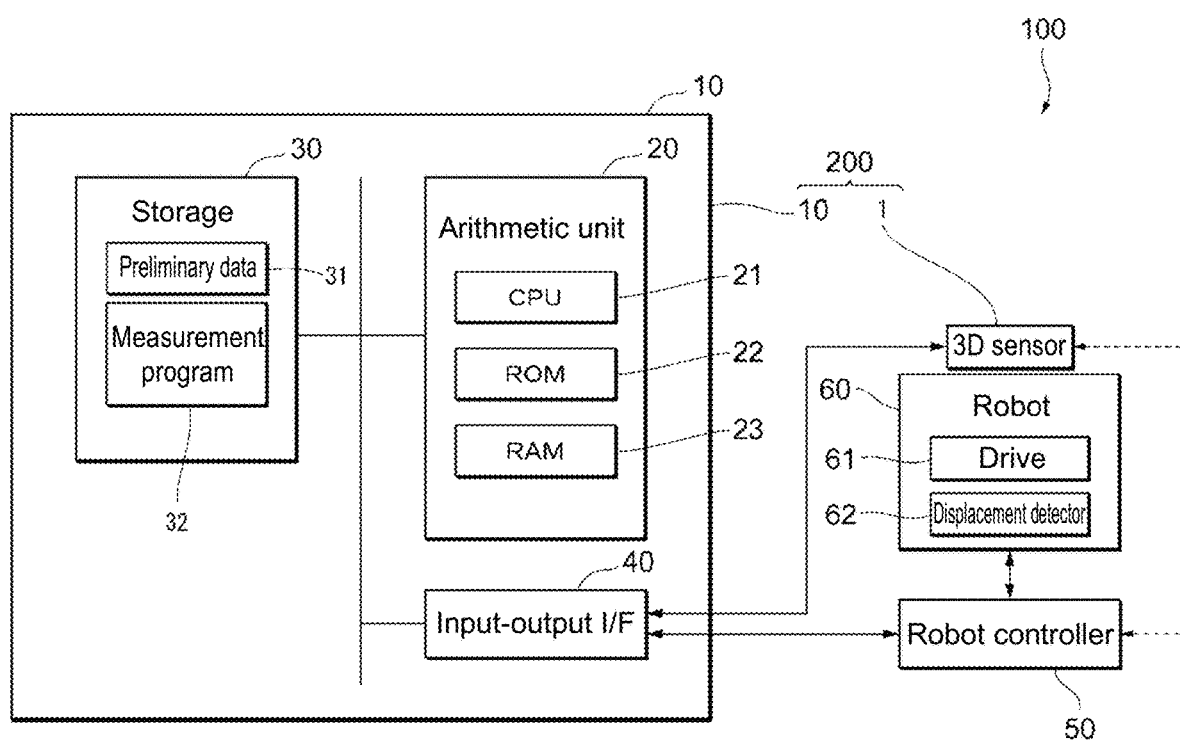
FIG. 3 is a schematic block diagram of the measurement system and a measurement device according to the present embodiment, showing the hardware configuration.

Although the robot 60 includes a single drive 61 and a single displacement detector 62 in the example shown in FIG. 3, the robot 60 may include as many drives 61 and displacement detectors 62 as the joints.

Functional Configuration

Figure 4:
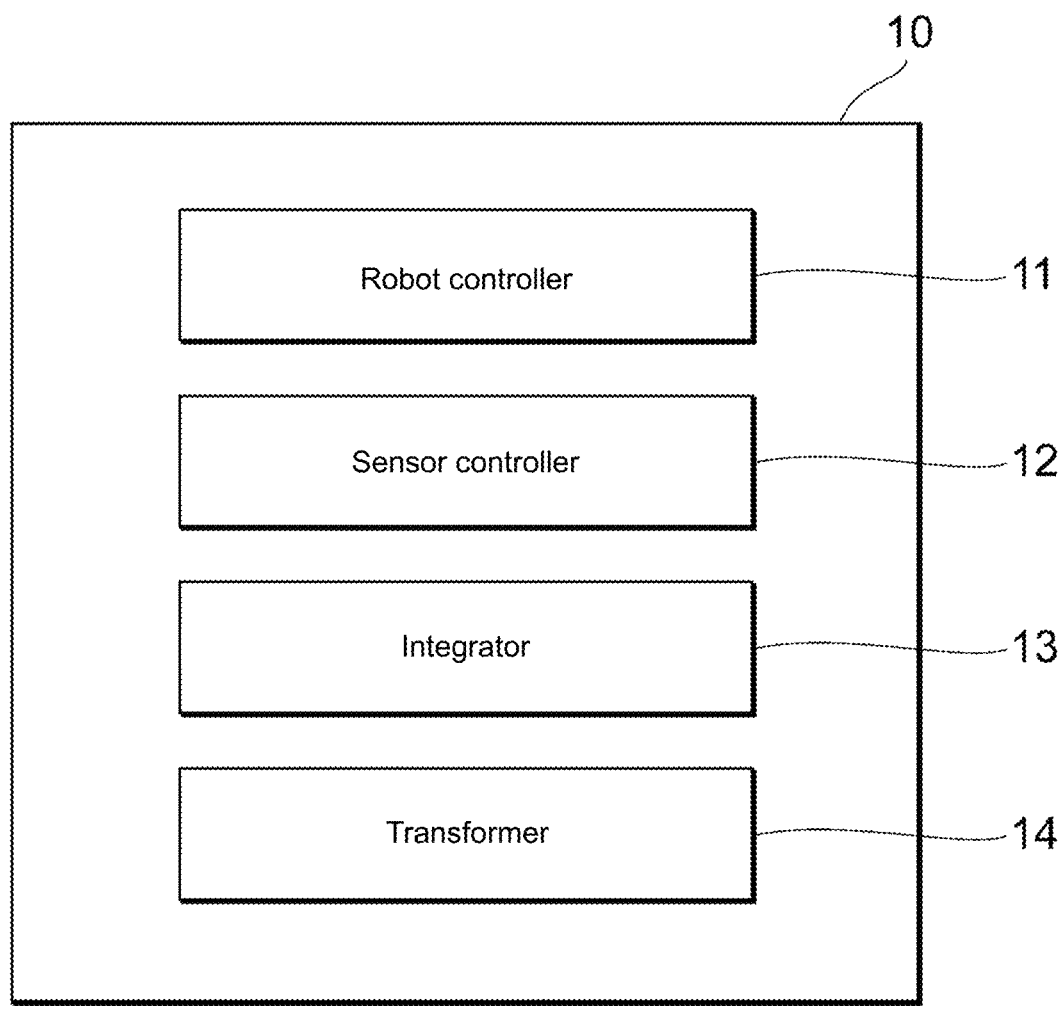
FIG. 4 is a schematic block diagram of the measurement system according to the present embodiment, showing its example functional components.

FIG. 4 is a schematic block diagram of the measurement system 100 according to the present embodiment, showing its example functional components. The hardware resources in the computer system 10 in cooperation with the measurement program 32 implement the functions of a robot controller 11, a sensor controller 12, an integrator 13, and a transformer 14.

The robot controller 11, the sensor controller 12, the integrator 13, and the transformer 14 in the computer system 10 may be implemented by a general-purpose processor and may be implemented by any device in the embodiments of the present disclosure. All or parts of the functions of these components may be implemented by dedicated circuitry, for example, an application specific integrated circuit (ASIC) or a field-programmable gate array (FPGA). The processes may be partially performed by an external device connected through a network.

The sensor controller 12 controls the 3D sensor 1 to obtain the 3D data about the target object by measurement at one or more measurement points. The multiple measurement points each have a different positional relationship between the 3D sensor 1 and the target object. The sensor controller 12 controls the 3D sensor 1 to measure, during driving of each joint of the robot 60, the 3D data about the target object at one or more measurement points. The sensor controller 12 controls the 3D sensor 1 to obtain, for example, during driving of the arm 3 of the robot 60, the 3D data about the target object by measurement at one or more measurement points. Obtaining the 3D data about the target object by measurement without stopping the motion of the robot 60 in this manner allows the robot 60 to more efficiently perform operations on the target object.

The 3D sensor 1 obtains 3D data about the target object by measurement at one or more measurement points at timing that may be asynchronous with timing at which the displacement detector 62 detects a displacement of each joint of the robot 60. The robot 60 is thus not to stop moving to match its position and posture for the 3D sensor 1 to obtain 3D data about the target object by measurement to its position and posture for the displacement detector 62 to detect the displacement of each joint of the robot 60. This reduces the time for obtaining the 3D data about the target object by measurement.

The integrator 13 performs 3D integration of 3D data about the target object obtained by measurement before an operation performed by the robot 60 on the target object and 3D data obtained by measurement after the operation performed by the robot 60 on the target object at one or more measurement points. More specifically, the integrator 13 deletes, from the 3D data about the target object obtained by measurement before the operation performed by the robot 60 on the target object, a portion subjected to the operation to generate preliminary 3D data and performs 3D integration of the preliminary 3D data and the 3D data about the target object obtained by measurement at one or more measurement points after the operation performed by the robot 60 on the target object. The 3D integration of the preliminary 3D data based on the 3D data obtained by measurement before the preceding operation and one or more 3D data pieces newly obtained by measurement in this manner can more robustly generate 3D data about the target object after the preceding operation at higher speed.

The 3D sensor 1 obtains, before the initial operation of multiple operations performed by the robot 60 on the target object, initial 3D data about the target object by measurement at the specific measurement point while the robot 60 is stopped. The displacement detector 62 detects, before the initial operation, an initial displacement of each joint of the robot 60 at the specific measurement point while the robot 60 is stopped. The transformer 14 calculates, based on the initial 3D data and the initial displacement, transformation from the sensor coordinate system to the robot coordinate system and transforms, from the sensor coordinate system to the robot coordinate system, the 3D coordinates of the points on the surface of the target object indicated by 3D data obtained through the 3D integration. The robot 60 can thus more accurately perform the operations on the target object based on the 3D data. In some embodiments, the measurement system 100 may transform, from the sensor coordinate system to the robot coordinate system, the 3D coordinates of the points on the surface of the target object indicated by the 3D data obtained through the 3D integration using image analysis, rather than using the initial displacement of each joint of the robot 60.

The robot controller 11 outputs, to the drive 61, a drive command for controlling the operations performed by the robot 60 based on the 3D coordinates of the points on the surface of the target object indicated by the 3D data obtained through the 3D integration. The robot controller 11 controls, after the initial 3D data is obtained by measurement and the initial displacement is detected, the robot 60 to continuously perform multiple operations without stopping the robot 60. This allows multiple operations to be continuously performed without stopping the robot 60 for obtaining the 3D data by measurement, thus increasing the work efficiency.

3. Operation Example

Figure 5:
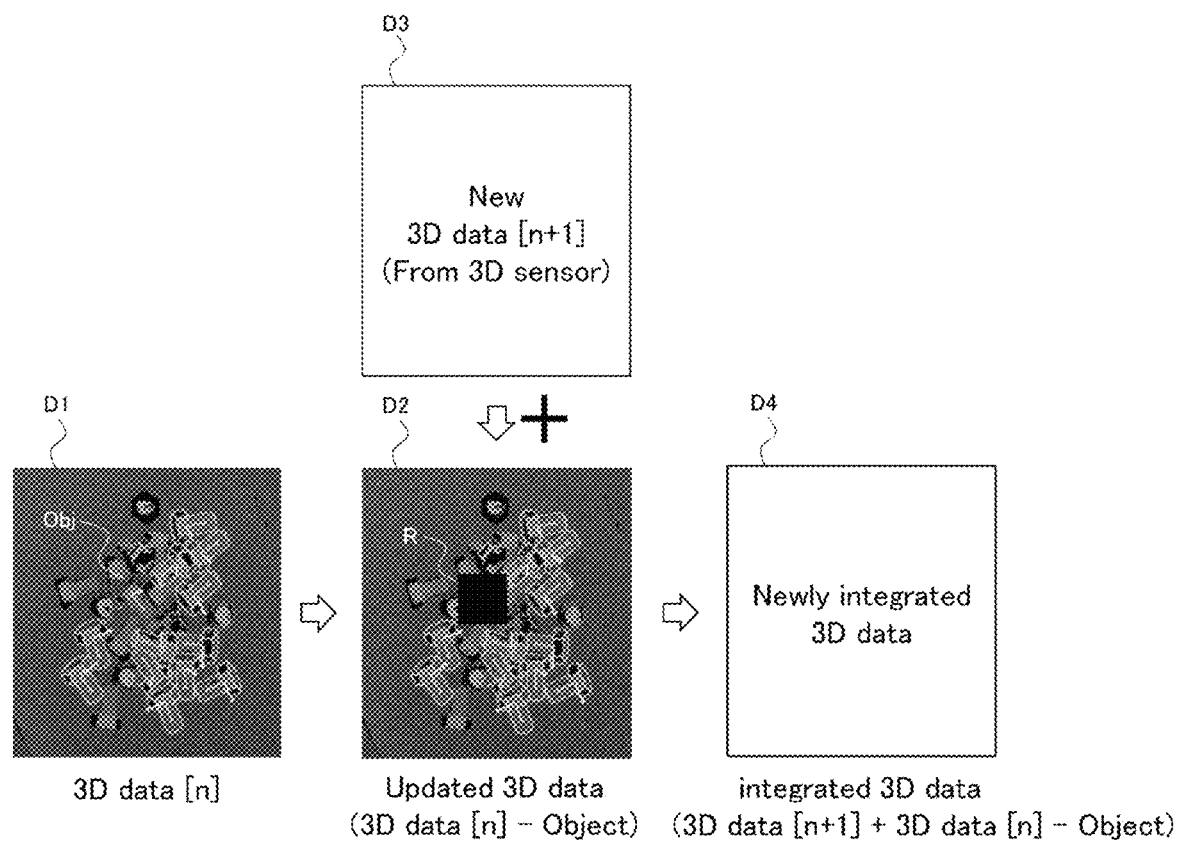
FIG. 5 is a schematic diagram describing a process performed by the measurement system according to the present embodiment.

FIG. 5 is a schematic diagram describing a process performed by the measurement system 100 according to the present embodiment. FIG. 5 shows example 3D data pieces generated when the robot 60 picks up a target object Obj.

The measurement system 100 deletes, from nth (n is a positive integer) 3D data D1 (3D data [n]) generated before the pickup of the target object Obj performed by the robot 60, a region R subjected to the pickup to obtain preliminary 3D data D2 (updated 3D data). The measurement system 100 also obtains the 3D data by measurement at one or more measurement points after the pickup of the target object Obj to obtain (n+1)th 3D data D3 (new 3D data [n+1]).

More specifically, for example, the measurement system 100 generates, using an appropriate rendering system or a renderer, an image of the target object Obj at a position at which the 3D data D1 is obtained with the camera. The image is generated based on position and orientation information (3D data) about the target object Obj in the 3D data D1 obtained before the pickup and imaging parameters for virtual cameras located at multiple (many) different viewpoints in a virtual 3D space. The measurement system 100 then separates the generated image of the target object Obj from a background image through binarization and generates a mask for covering a region including the target object Obj (corresponding to the region R described above). Such a mask is, for example, a rectangular or a circular bounded region (bounding box) including the target object Obj or a solid filled region (blob) filling the inside of the target object Obj. The mask is then used on (e.g., placed over) the 3D data D1 generated before the pickup to delete, from the 3D data D1, the region R subjected to the pickup. This generates the preliminary 3D data D2. The region R may be deleted using the 3D data in the sensor coordinate system or using the transformed 3D data in the robot coordinate system. The deletion is not limited to the above examples.

The measurement system 100 performs 3D integration of the preliminary 3D data D2 and the (n+1)th 3D data D3 to obtain newly integrated 3D data D4. The newly integrated 3D data D4 is generated by matching of data included in the preliminary 3D data D2 except the region R to data included in the (n+1)th 3D data D3 except the region R, and integrating the matched data with the data about the region R included in the (n+1)th 3D data D3. The measurement system 100 identifies a target object using the newly integrated 3D data D4 and operates a target object with the robot 60. The newly integrated 3D data D4 is used as preliminary 3D data for a next operation.

In this manner, the measurement system 100 reuses 3D data generated in the preceding operation rather than newly generating 3D data in each operation performed by the robot 60 on a target object and can thus more robustly generate the 3D data at higher speed.

The 3D integration for obtaining 3D data D4 is not limited to the above method. The 3D integration may be performed with various methods using the preliminary 3D data D2 and the 3D data about the target object obtained by measurement at one or more measurement points. For example, in place of or in addition to ICP, 3D integration of 3D data obtained by measurement at each measurement point and the preliminary 3D data D2 may be performed based on the initial displacement of each joint of the robot 60 and the displacement of each joint of the robot 60 detected when the 3D data is obtained by the 3D sensor 1 by the measurement at each measurement point.

FIG. 6 is a flowchart of a process performed by the measurement system 100 according to the present embodiment. The measurement system 100 first obtains initial 3D data about the target object by measurement at the specific measurement point while the robot 60 is stopped (S10). The measurement system 100 also detects an initial displacement of each joint of the robot 60 at the specific measurement point while the robot 60 is stopped (S11). The measurement system 100 then calculates transformation from the sensor coordinate system to the robot coordinate system based on the initial 3D data and the initial displacement (S12).

The measurement system 100 then obtains 3D data about the target object by measurement and one or more displacements of each joint of the robot 60 at one or more measurement points without stopping the robot 60 (S13). The 3D data and the displacements of each joint of the robot 60 may be obtained by measurement during, for example, transportation of a target object performed by of the robot 60 with the hand 2.

The measurement system 100 performs 3D integration of preliminary 3D data and the 3D data obtained by measurement at one or more measurement points (S14). In the initial operation, the preliminary 3D data is the initial 3D data. The measurement system 100 transforms, from the sensor coordinate system to the robot coordinate system, 3D coordinates indicated by the 3D data obtained through the 3D integration (S15). This operation may use the transformation from the sensor coordinate system to the robot coordinate system calculated before.

The measurement system 100 controls the operation performed by the robot 60 based on the 3D coordinates (S16). The measurement system 100 controls, for example, the robot 60 to pick up a target object with the hand 2 and to transport the target object to a predetermined location.

The measurement system 100 deletes, from the 3D data, a portion subjected to the operation performed by the robot 60 to generate preliminary 3D data (S17). For example, when the robot 60 picks up a target object, the measurement system 100 deletes, from the 3D data, a region including the target object that has been picked up. This generates preliminary 3D data to be used in subsequent 3D integration.

When the operation on the target object is not complete (No in S18), the measurement system 100 again performs the processing in S13 to S17. The preliminary 3D data used in the processing in S14 is updated for each operation.

The above embodiments and modifications intend to facilitate understanding of the present disclosure and do not limit the present disclosure. The elements in the embodiments and the modifications and their positions, materials, conditions, shapes, sizes, or other parameters are not limited to those illustrated above but may be changed as appropriate. The components in different embodiments or modifications may be partly combined or interchanged.

More specifically, when the device, the system, or a part of the system for setting lighting conditions used in the above inspection of a target object is implemented by a software functional unit as a separate product for sale or use, the software functional unit may be stored in a computer-readable storage medium. In this manner, the characteristics of the technique according to the aspects of the present disclosure, a part contributable to known techniques of the technique according to the aspects of the present disclosure, or the entire or a part of the technique according to the aspects of the present disclosure may be implemented by a software product. The computer software product including commands to instruct computer devices (e.g., a personal computer, a server, or a network device) to perform some or all of the steps in the methods described in one or more embodiments according to the present disclosure may be stored in a storage medium. The above storage medium may be one of various media such as a universal serial bus (USB), a ROM, a RAM, a mobile hard disk, a floppy disk, or an optical disk, which can store program codes.

REFERENCE SIGNS LIST 1 3D sensor
2 hand
3 arm
5 workpiece (target object)
6, 7 container
10 computer system
11 robot controller
12 sensor controller
13 integrator
14 transformer
20 arithmetic unit
21 CPU
22 ROM
23 RAM
30 storage
31 preliminary data
32 measurement program
40 input-output interface
50 robot controller
60 robot
61 drive
62 displacement detector
100 measurement system
200 measurement device

What is claimed is:

1. A measurement system, comprising:
    a three-dimensional sensor installable on a robot to obtain, by measurement, three-dimensional data indicating three-dimensional coordinates of surface points on a surface of a target object;
    a displacement detector configured to detect a displacement of a joint of the robot;
    a drive configured to drive the joint of the robot;
    a sensor controller configured to control the three-dimensional sensor to obtain three-dimensional data about the target object by measurement at one or more measurement points;
    an integrator configured to perform three-dimensional integration of three-dimensional data about the target object obtained by measurement before a first operation performed by the robot on the target object and three-dimensional data about the target object obtained by the sensor controller by measurement at the one or more measurement points after the first operation performed by the robot on the target object; and
    a robot controller configured to output, to the drive, a drive command for controlling a second operation performed by the robot based on three-dimensional coordinates of the surface points on the surface of the target object indicated by three-dimensional data obtained through the three-dimensional integration.

2. The measurement system according to claim 1, wherein the integrator deletes, from the three-dimensional data about the target object obtained by measurement before the first operation performed by the robot on the target object, a portion subjected to the first operation to generate preliminary three-dimensional data and performs three-dimensional integration of the preliminary three-dimensional data and three-dimensional data about the target object obtained by the sensor controller by measurement at the one or more measurement points after the first operation performed by the robot on the target object.

3. The measurement system according to claim 1, wherein
    the three-dimensional sensor obtains, before an initial operation of a plurality of operations performed by the robot on the target object, initial three-dimensional data about the target object by measurement at a specific measurement point while the robot is stopped,
    the displacement detector detects, before the initial operation, an initial displacement of the joint of the robot at the specific measurement point while the robot is stopped, and
    the measurement system further comprises a transformer configured to calculate, based on the initial three-dimensional data and the initial displacement, transformation from a sensor coordinate system to a robot coordinate system and to transform, from the sensor coordinate system to the robot coordinate system, the three-dimensional coordinates of the surface points on the surface of the target object indicated by the three-dimensional data obtained through the three-dimensional integration.

4. The measurement system according to claim 3, wherein the robot controller controls, after the initial three-dimensional data is obtained by measurement and the initial displacement is detected, the robot to continuously perform the plurality of operations without stopping the robot.

5. The measurement system according to claim 1, wherein the sensor controller controls the three-dimensional sensor to obtain three-dimensional data about the target object by measurement at the one or more measurement points during driving of the joint of the robot.

6. The measurement system according to claim 5, wherein the three-dimensional sensor obtains three-dimensional data about the target object by measurement at the one or more measurement points at timing asynchronous with timing at which the displacement detector detects a displacement of the joint of the robot.

7. A measurement device for receiving input information indicating a displacement of a joint of a robot output from a displacement detector and outputting a drive command to a drive configured to drive the joint of the robot, the measurement device comprising:
    a three-dimensional sensor installable on the robot to obtain, by measurement, three-dimensional data indicating three-dimensional coordinates of surface points on a surface of a target object;
    a sensor controller configured to control the three-dimensional sensor to obtain three-dimensional data about the target object by measurement at one or more measurement points;
    an integrator configured to perform three-dimensional integration of three-dimensional data about the target object obtained by measurement before a first operation performed by the robot on the target object and three-dimensional data about the target object obtained by the sensor controller by measurement at the one or more measurement points after the first operation performed by the robot on the target object; and
    a robot controller configured to output the drive command for controlling a second operation performed by the robot based on three-dimensional coordinates of the surface points on the surface of the target object indicated by three-dimensional data obtained through the three-dimensional integration.

8. A measurement method implementable by a measurement device including a three-dimensional sensor installable on a robot to obtain, by measurement, three-dimensional data indicating three-dimensional coordinates of surface points on a surface of a target object, the measurement device being configured to receive input information indicating a displacement of a joint of the robot output from a displacement detector and to output a drive command to a drive configured to drive the joint of the robot, the measurement method comprising:
    controlling the three-dimensional sensor to obtain three-dimensional data about the target object by measurement at one or more measurement points;
    performing three-dimensional integration of three-dimensional data about the target object obtained by measurement before a first operation performed by the robot on the target object and three-dimensional data about the target object obtained by measurement at the one or more measurement points after the first operation performed by the robot on the target object; and
    outputting the drive command for controlling a second operation performed by the robot based on three-dimensional coordinates of the surface points on the surface of the target object indicated by three-dimensional data obtained through the three-dimensional integration.

9. A non-transitory computer-readable medium having stored therein computer executable instructions for execution by a computing device, the non-transitory computer-readable medium comprising:

a measurement program executable by a measurement device, the measurement device including a three-dimensional sensor installable on a robot to obtain, by measurement, three-dimensional data indicating three-dimensional coordinates of surface points on a surface of a target object;

wherein the measurement device is configured to receive input information indicating a displacement of a joint of the robot output from a displacement detector and to output a drive command to a drive configured to drive the joint of the robot; and wherein the measurement program is configured to cause the measurement device to perform the method of claim 8.

* * * * *